United States Patent
Bobrowicz

(10) Patent No.: US 6,857,641 B2
(45) Date of Patent: Feb. 22, 2005

(54) DEVICE FOR GLIDING OVER SNOW

(75) Inventor: Eric Bobrowicz, Monetier les Bains (FR)

(73) Assignee: Skis Rossignol S.A., Voiron (FR)

( * ) Notice: Subject to any disclaimer, the term of this patent is extended or adjusted under 35 U.S.C. 154(b) by 0 days.

(21) Appl. No.: 10/342,037

(22) Filed: Jan. 14, 2003

(65) Prior Publication Data

US 2003/0160404 A1 Aug. 28, 2003

(30) Foreign Application Priority Data

Feb. 25, 2002 (FR) .............................................. 02 02353

(51) Int. Cl.[7] .............................. B62B 9/04; A63C 5/00; A62B 9/04; B62M 1/00
(52) U.S. Cl. .................... 280/14.21; 280/607; 280/845; 280/87.042
(58) Field of Search .......................... 280/14.21, 14.22, 280/14.25, 14.26, 11.12, 11.14, 11.18, 7.12, 15–18, 22.1, 28, 28.16, 87.042, 87.043, 845, 601, 606, 607; 441/65, 66, 68, 70, 74, 79

(56) References Cited

U.S. PATENT DOCUMENTS

| | | | |
|---|---|---|---|
| 3,030,123 A | * | 4/1962 | Dworak .................... 280/14.21 |
| 3,778,077 A | | 12/1973 | Johnson |
| 4,138,128 A | * | 2/1979 | Criss ............................ 280/16 |
| 4,221,394 A | | 9/1980 | Campbell |
| 5,618,051 A | * | 4/1997 | Kobylenski et al. ...... 280/14.21 |
| 6,702,315 B2 | * | 3/2004 | Barbieri et al. ............. 280/605 |
| 2002/0008360 A1 | * | 1/2002 | Ellington .................. 280/14.21 |
| 2002/0070515 A1 | | 6/2002 | Barbieri et al. |
| 2002/0158430 A1 | | 10/2002 | Farcot et al. |
| 2002/0190501 A1 | * | 12/2002 | Barbieri et al. ............. 280/604 |
| 2003/0085537 A1 | * | 5/2003 | Breuer et al. ............ 280/14.21 |
| 2003/0193168 A1 | * | 10/2003 | Chou ......................... 280/607 |

FOREIGN PATENT DOCUMENTS

| | | | |
|---|---|---|---|
| AU | 5 318 490 | 11/1990 | |
| DE | 36 28 623 A | 3/1988 | |
| EP | 1213040 A2 * | 6/2002 | ............ A63C/5/03 |
| EP | 1 213 041 | 6/2002 | |
| FR | 2 423 243 | 11/1979 | |
| FR | 2 428 452 A | 1/1980 | |
| FR | 2 823 983 | 10/2002 | |

* cited by examiner

Primary Examiner—Lesley D. Morris
Assistant Examiner—Gerald B. Klebe
(74) Attorney, Agent, or Firm—Burr & Brown

(57) ABSTRACT

A device for gliding over snow includes a runner equipped with a gliding sole, on which is mounted a plate for receiving the user's two free feet. A projection over the plane of the gliding sole of the rear end of the plate is offset rearward by at least 20 millimeters relative to a projection of the rear end of the runner.

5 Claims, 1 Drawing Sheet

DEVICE FOR GLIDING OVER SNOW

TECHNICAL FIELD

The invention relates to the technical field of sports in which one glides over snow. It relates more precisely to gliding devices composed of a runner surmounted by a plate on which the user stands without his feet being fixed. This type of device makes it possible to move over the snow in a manner substantially similar to that of a skateboard. The invention relates more precisely to a structural arrangement of such a device that makes it easier to initiate jumps.

PRIOR ARTS

Document FR 2 428 452 describes a device of this type that includes a gliding runner having two raised zones at the front and at the rear, forming tips. In the central area, the runner receives a platform or plate that extends laterally beyond the runner in order to allow the user to arrange his feet transversely. Given the length of the board of the runner for gliding, this type of device makes it possible to move over slopes while making relatively long-radius turns in comparison to other, more recent, similar solutions. Moreover, it is practically impossible to jump using this type of device, since the zone where the user exerts forces is located substantially in the central area of the runner for gliding.

Developments of this type of device are, in particular, described in documents U.S. Pat. No. 4,221,394, FR 2 423 243, AU 5 318 490, FR 2 823 983 and EP 1 213 041. These developments consist firstly in using two distinct runners for gliding mounted under the plate by means of systems allowing a lateral inclination of the plate. This arrangement enables the user to lean the plate sideways, generating a pivoting of the runners for gliding so as to achieve shorter-radius turns.

However, the use of these articulation mechanisms makes the device slightly more complex to manufacture and to adjust. Furthermore, the articulation mechanisms must be fairly robust, which requires them to be made from metal. This makes the device for gliding heavier, to the detriment of possibilities of carrying out figures and jumps. Moreover, when it is desired to jump with this type of device that includes two runners, the fact that the runners have a certain freedom of movement can generate risks of loss of control in the jump phases.

Other developments have also been proposed, derived from the structure described in document FR 2 428 452, in which the runner for gliding has a length substantially equal to that of the plate. This structure, closer to a conventional skateboard, nevertheless has drawbacks, particularly regarding the initiation of jumps. What happens is that, in this type of device, the plate is slightly shorter than the runner for gliding, and the ends of the plate are in line with the tip of the runner. It will thus be appreciated that this is not a very high-performance type of device for initiating jumps, when it is necessary to exert forces toward the rear of the plate in order to allow tilting and, more precisely, the lifting of the front of the runner upward.

One of the objectives of the invention is to facilitate the initiation of jumps, either by making it possible to achieve the tilt by expending less effort or by increasing the speed of tilt by allowing greater effort to be expended.

SUMMARY OF THE INVENTION

The invention thus relates to a device for gliding over snow that includes a runner, equipped with a gliding sole, and on which a plate for receiving the user's two free feet is mounted.

According to the invention, the projection over the plane of the gliding sole of the rear end of the plate is offset rearward by at least 20 millimeters relative to the projection of the rear end of the runner in this same plane.

In other words, the invention consists in offsetting the plate that receives the user's forces rearward. Thus, the forces exerted by the user's foot at the rear end of the plate are behind the runner and, more precisely, behind the line of rear contact of the runner on the snow. It follows that the forces thus exerted very easily generate the tilting of the runner relative to this line of rear contact, which thus makes it possible to raise the front end of the board.

The jump-initiation movement, also known as "ollie", is thus obtained either with an exerted force of less intensity than when the plate is centered relative to the runner, or with greater rapidity and amplitude. In practice, it has been ascertained that an offset of at least 20 millimeters rearward is necessary, it being possible for this offset to be as much as 60 millimeters.

In practice, preference will also be given for the projection over the plane of the gliding sole of the front end of the plate to be offset rearward relative to the projection of the rear end of the runner. Indeed, by virtue of this structural arrangement, the center of gravity of the plate is set back and the moment needed to raise the front tip of the device is thus less great.

In practice, the rearward offset of the projection of the front end of the plate over the plane of the gliding sole may be between 0 and 40 millimeters relative to the projection of the front end of the runner in the same plane.

Advantageously, the plate may have raised ends, making it possible to produce forces in the extension of the leg when the latter is inclined and when the foot bears on the rear end of the plate. In the same way, the lateral edges of the plate may also be raised in order to receive the bearing forces of the toe or heel of the foot when the latter is arranged transversely over the central part of the plate.

Advantageously, in practice, the upper face of the plate may be equipped with a gripping material, preventing any sliding or shifting of the foot on the plate.

BRIEF DESCRIPTION OF THE FIGURES

The way in which the invention is implemented and the advantages arising therefrom will become clearly apparent from the following description of the embodiment, supported by the appended figures, in which.

DETAILED DESCRIPTION OF THE INVENTION

Figure 1:
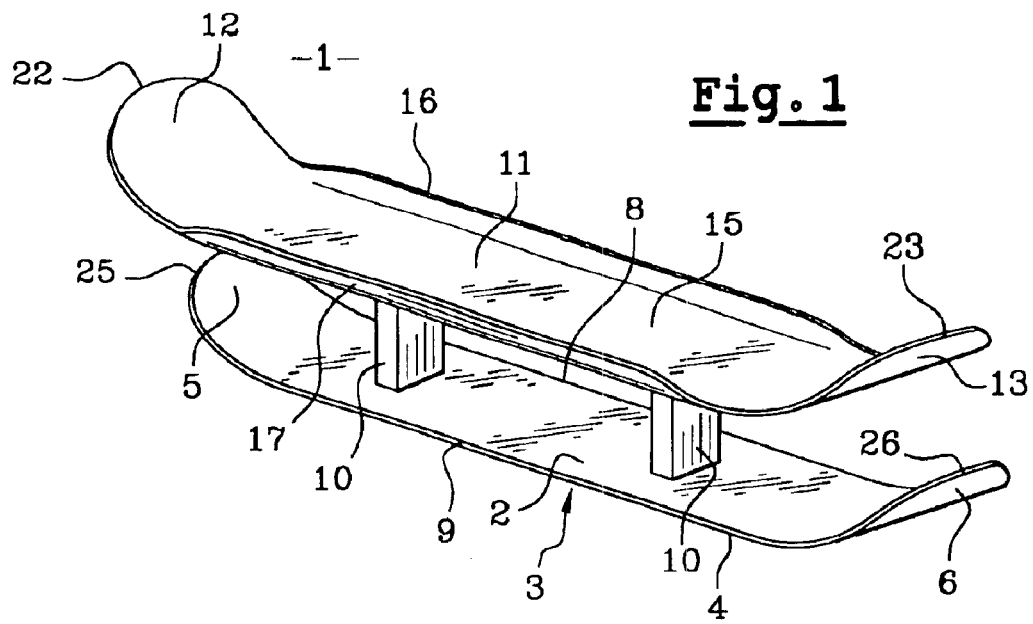
FIG. 1 is a summary perspective view of a device for gliding produced according to the invention.

As already stated, the invention relates to a device for gliding, as illustrated in FIG. 1. Such a device (1) comprises a runner (2) for gliding equipped under its lower face with a gliding sole (3) and on its lateral edges with metal edges (4). This board (2) has two raised ends forming tips (5, 6).

The side line (8, 9) of the runner (2) may advantageously be waisted in order to allow "curved" turns.

On this upper face, the runner (2) has two spacers or chocks (10), allowing the mounting of the plate (11). These chocks may have very diverse geometries, and there may also be more of them than those illustrated in FIG. 1. These chocks may, if appropriate, have shock-absorbing properties or, at the very least, properties of attenuating the vibrations being transmitted from the runner (2).

The plate (11) also has ends (12, 13) that are raised in order, on the one hand, to surmount the tips (5, 6) of the board by a sufficient height to avoid any contact and, on the other hand, in order to form slightly inclined zones on which the bearing forces of the user will be more effective, particularly when his legs are inclined relative to the plane of the sole.

In the same way, in order to render the forces exerted by the user at the tips and heels of his boot more effective, in the central part (15) of the plate (11) the lateral edges (16, 17) have an upwardly raised curvature.

Figure 2:
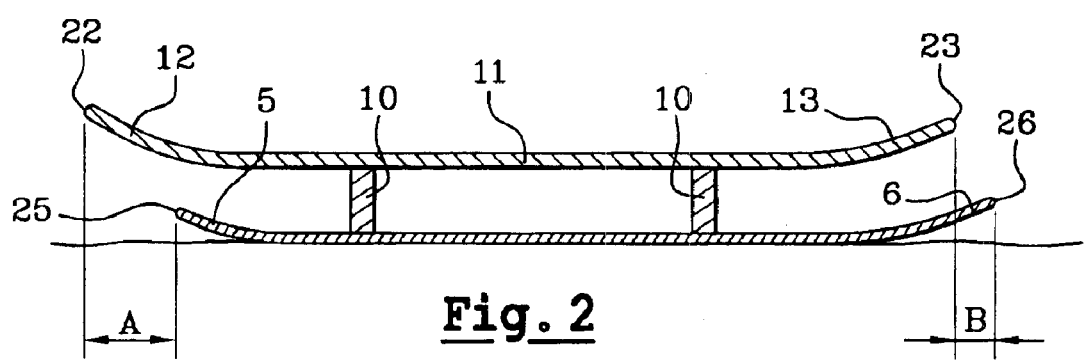
FIG. 2 is a longitudinal sectional view of the device in FIG. 1.

According to the invention, and as illustrated in FIG. 2, the rear end point (22) of the rear portion (12) has a projection in the plane of the sole (3) that is offset rearward relative to the projection of the point (25) of the tip (5) of the runner (2). This rearward offset of a distance (A) is between 20 and 60 millimeters.

In the same way, the front end point (23) of the upwardly curved portion (13) of the plate (11) has a projection that is offset rearward relative to that of the end point (26) located at the front of the tip (6) of the runner (2). This offset, of a distance B, is between 0 and 40 millimeters.

Figure 3:
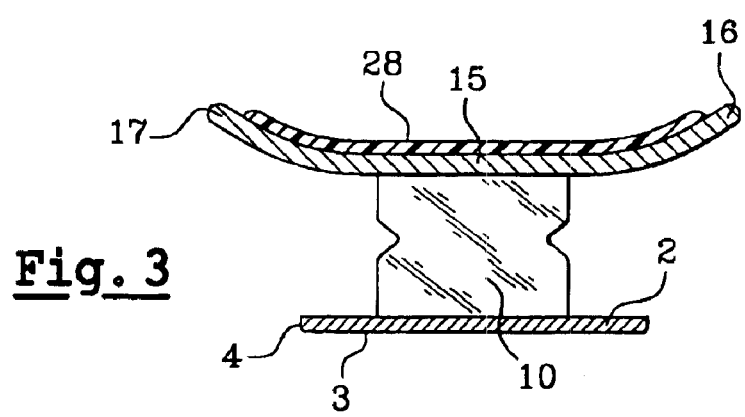
FIG. 3 is a transverse sectional view shown in the median area of the device in FIG. 1.

As may be seen in FIG. 3, the edges (16, 17) of the central part (15) of the plate (11) are also curved upward, particularly in order to avoid the risks of catching the snow when the board is very greatly inclined, which is particularly necessary when the runner (2) has a narrower width than the plate (11), as illustrated in FIG. 3.

According to another characteristic of the invention, the upper face of the plate (11) may be equipped with a layer (28) of a gripping material such as a polyester, polyurethane or rubber foam, or, more generally, any gripping material for preventing the sliding of the user's boot sole over the plate.

It emerges from the aforesaid that the device for gliding according to the invention has the major advantage of improving the rearward tilting power in order to initiate jumps.

What is claimed is:

1. A device for gliding over snow comprising only one runner equipped with a gliding sole on which is mounted a plate for receiving a user's two free feet, wherein a projection over a plane of the gliding sole of a rear end of the plate is offset rearward by at least 20 millimeters relative to a projection of a rear end of the runner, and wherein a projection over a plane of the gliding sole of a front end of the plate is offset rearward relative to a projection of a front end of the runner.

2. The device for gliding over snow as claimed in claim 1, wherein the projection over the plane of the gliding sole of the rear end of the plate is offset by at most 60 millimeters relative to the projection of the rear end of the runner.

3. The device for gliding over snow as claimed in claim 1, wherein the projection of the front end of the plate is offset rearward by a distance of less than 40 millimeters relative to the projection of the front end of the runner.

4. The device for gliding over snow as claimed in claim 1, wherein the plate has at least one of raised edges and raised ends.

5. The device for gliding over snow as claimed in claim 1, wherein an upper face of the plate is equipped with a gripping material.

* * * * *